Jan. 11, 1927.　　　C. L. SCHNEIDER ET AL　　　1,613,728
TRAILER
Filed March 12, 1924　　　3 Sheets-Sheet 3
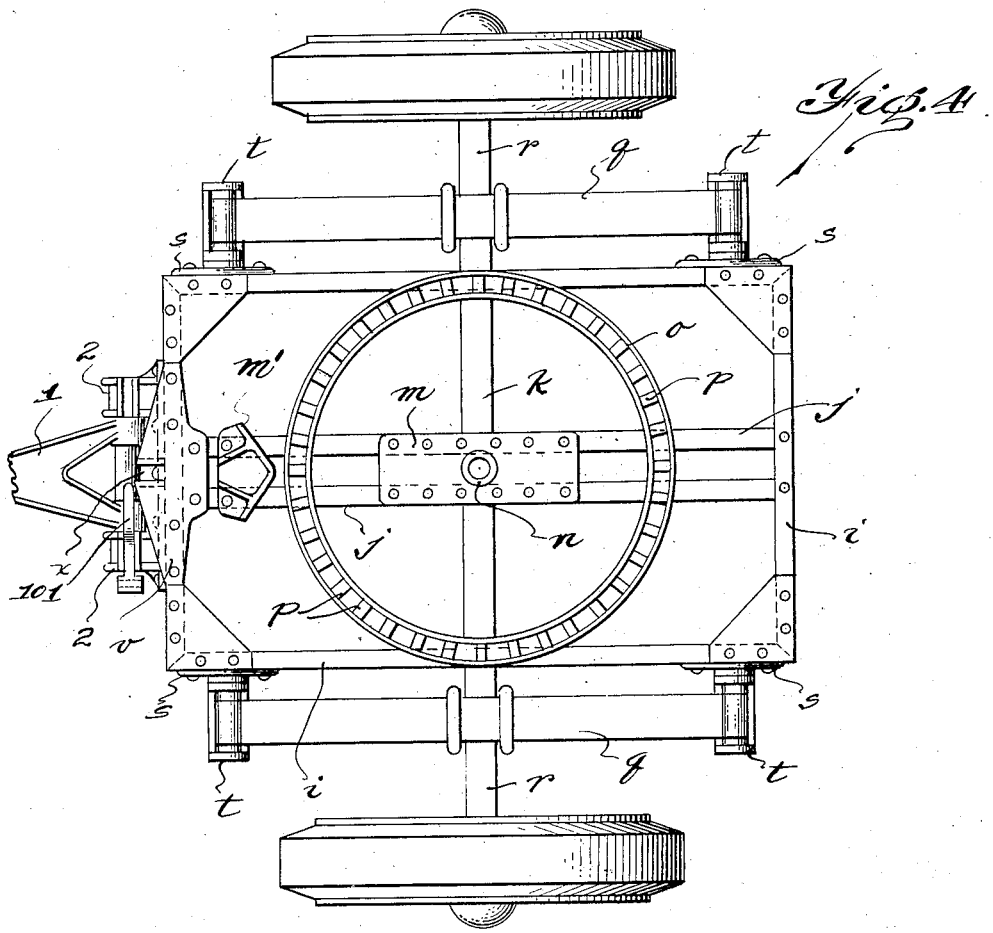
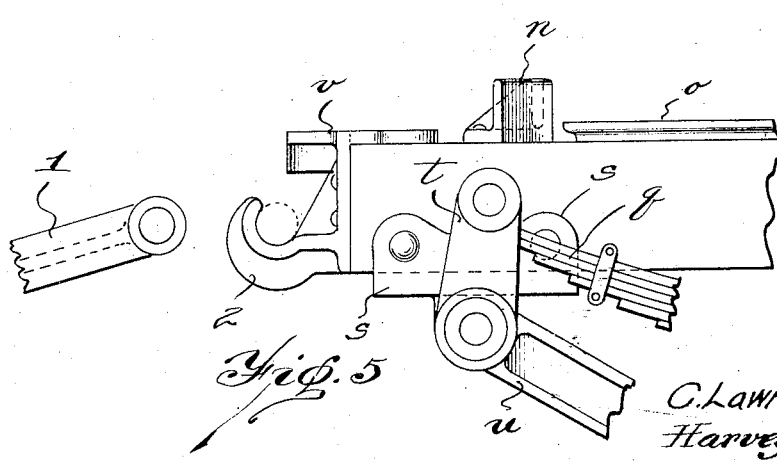
Inventors
C. Lawrence Schneider
Harvey C. Fruehauf
By Stuart C. Barnes
Attorney Patented Jan. 11, 1927.

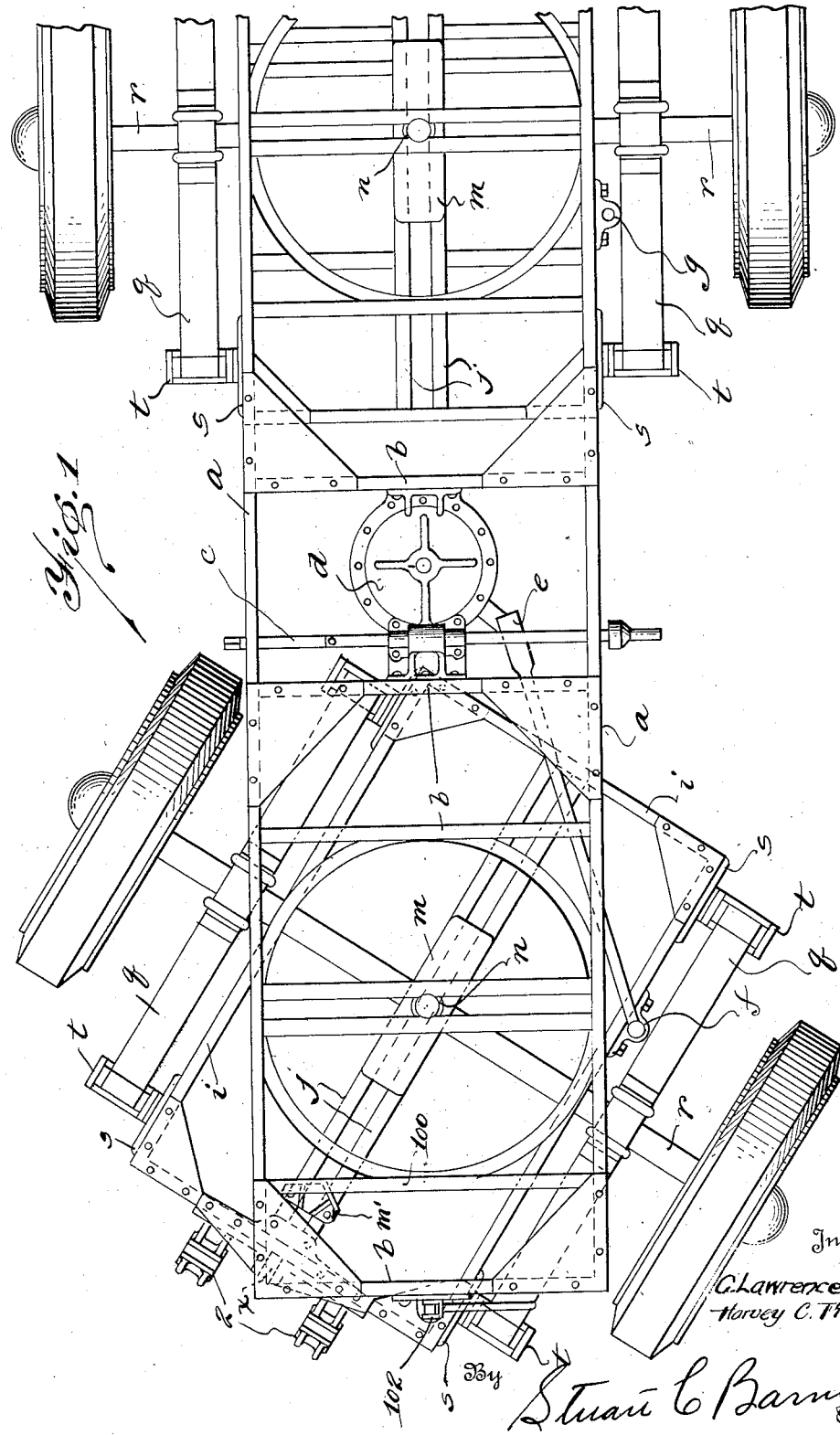

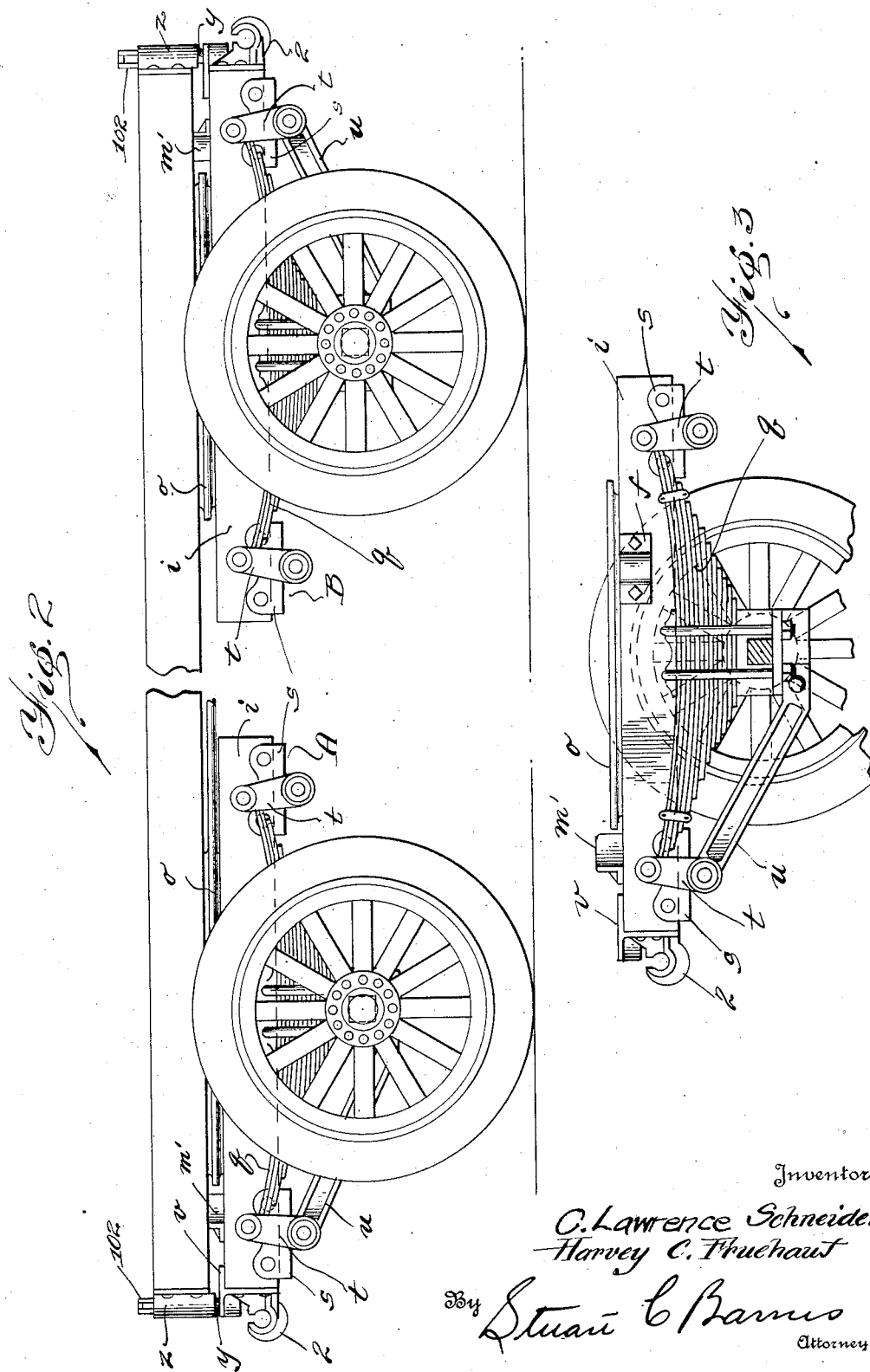

1,613,728

UNITED STATES PATENT OFFICE.

CHARLES LAWRENCE SCHNEIDER AND HARVEY C. FRUEHAUF, OF DETROIT, MICHIGAN, ASSIGNORS TO FRUEHAUF TRAILER COMPANY, OF DETROIT, MICHIGAN, A CORPORATION OF MICHIGAN.

TRAILER.

Application filed March 12, 1924. Serial No. 698,604.

This invention relates to trailers and has for its object a four wheel reversible trailer built with special fifth wheel steering trucks at both ends which may be locked or released with respect to the trailer frame for the purpose of reversing the trailer.

These fifth-wheel-carrying trucks have a special arrangement of the spring suspension which permits the lowering of not only the truck frame but also of the trailer frame. This permits the standardization of trailer frames. Heretofore with the higher truck frames in a trailer of this design, it has been necessary to build special trailer frames for each particular job so as to combine the trailer frame and body platform. With the trailer frame dropped down below the tops of the wheels, this trailer frame can be used as a standard unit and special body platforms superimposed in accordance with the need of the particular job. These body platforms are ordinarily built of wood and consequently no special difficulty is encountered in building body platforms to meet the particular needs of any particular job. This arrangement results in considerable saving in trailer manufacturing costs.

A still further improvement relates to the steering truck or undergear which has a special frame construction and carries a roller bearing center plate together with means for limiting the turning angle of the truck with respect to the trailer frame to prevent the wheels striking the frame.

A still further feature has to do with the special form of radius rod construction which causes the draft to be conveyed to the axle through the radius rod instead of through the spring.

In the drawings:

Fig. 1 is a plan view of the trailer frame together with the undergear.

Fig. 2 is a side elevation of the same.

Fig. 3 is a side elevation of one of the trucks which form the undergear.

Fig. 4 is a plan view of the same.

Fig. 5 is a detail of one of the trucks showing a modified arrangement of the removable tongue and hook.

The trailer frame comprises suitable side sills $a$ with cross members $b$ some of which are suitably gusseted to the sills to make a strong, firm trailer chassis. The steering wheels may be locked at either end at a prescribed angle for backing (described and claimed in Patent No. 1,521,758, of William J. Craig granted January 6, 1925). This arrangement comprises a crank $c$ which operates through a worm and worm wheel (not shown) in the case $d$ to fix the position of the steering arm $e$. This steering arm $e$ may be either in the bracket $f$ or the bracket $g$, of one truck or the other.

The undergear comprises a pair of steering trucks A and B: each steering truck comprises a rectangular, properly gusseted truck frame $i$. This truck frame has a pair of center channels or angles $j$ which run longitudinally of the truck frame. The cross bar $k$ connects the side sills of the truck with longitudinal bars. The truck bolster plate $m$ is supported at their intersection and is provided with a king bolt socket $n$. The lower fifth wheel or circle is carried on these longitudinal bars and the side wheels. This is designated $o$ and is provided with a plurality of roller bearings $p$ to make its contact with the upper fifth wheel member, as antifriction is possible.

At the outer end of the longitudinal bars $j$ a triangular stop plate $m'$ is provided. The purpose of this stop plate is to engage the cross bar 100 and limit the turning movement of the truck with respect to the trailer frame before the wheels strike the side of the trailer frame. This saves both the wheels and the trailer frame from injury. The semi-elliptical springs $q$ are secured to the dead axle $r$ at the sides of the truck frame. This enables the spring hangers $s$ to be carried on the sides of the truck frame and the spring shackles $t$ project upwardly from the spring hangers. This carries the eyes of the springs $q$ up considerably higher, thereby giving a sort of semi-underslung condition to the truck frame. This very materially lowers the center of gravity of the truck frame. With the truck frame semi-underslung with respect to the springs, the trailer frame itself can be brought down considerably. This is well illustrated in Fig. 2, where it will be seen that the trailer frame is dropped down below the tops of the wheels. This permits the superimposing of a body platform on the trailer frame. This was not possible with the old high frame trailers, if the body had any considerable overhang, for the vehicle then became top-heavy. It was therefore customary to build the body platform and trailer frame as one unit. This was very expensive as each special body required a special steel trailer frame.

It will be noticed that radius rods $u$ are attached to the underside of the axle and are secured at their outer ends to the spring hangers $s$. This relieves the spring of the draft.

The truck frame has at its outer end a lock plate $v$ provided with a center keeper slot $x$. A locking pin $y$ can be placed in the lock bracket $z$ attached to either end of the trailer. When the steering wheels are swung around to the center position the pin drops in the keeper slot $x$ and thereby locks the truck in center position. This is the position it is desired to maintain when the truck is operating as a rear truck of the trailer.

If it is desired to reverse the trailer, all that is necessary is to lift the tongue 1 out of the tongue-receiving hooks 2, and drop it into the tongue-receiving hooks at the opposite ends of the trailer. The end of the tongue is provided with a T-like casting which provides the lateral extensions which can drop into the tongue-receiving hooks when the bar of the T is turned around by the lever 101 so that the flat side registers with the opening in the hooks. The locking pin is pulled out of the keeper slot by turning the eccentric lever and the locking pin lever at the opposite end is turned to drop into the bracket at the opposite end of the trailer when the wheels swing around to center position. The pin will automatically drop into the socket and lock the wheels when the center position is reached.

A trailer built in accordance with the directions given above will not snake from side to side in following its leader. It has manifest advantages in simplicity of construction, and unlikelihood of disorder such as possessed by the so-called knuckle-steer trailer.

What we claim is:

1. In a trailer, the combination of a trailer frame, a steering truck having a rectangular frame and connected to said trailer frame to swivel with respect thereto, and a triangular stop member supported on the steering truck and arranged to engage the trailer frame with one face when the truck is turned to the limit in one direction and to engage the truck frame with the second face when the truck frame is turned to the limit in the opposite direction.

2. In a trailer, a trailer frame provided with one or more cross bars, a steering truck comprising a rectangular frame and having a swivel connection to said trailer frame, said rectangular frame provided with a longitudinal running center bar, and a stop member supported at the front end of the center bar and projecting up into the trailer frame and arranged to strike one cross bar of the trailer frame when the truck is turned to the limit in one direction and to strike the same cross bar near its opposite end when the truck frame is turned to its limit in the opposite direction.

3. In a trailer, a trailer frame, a truck under each end of the trailer frame for supporting the same, each truck having a frame, an axle, springs secured to the axle for supporting the truck frame, radius rods connected to the axle and extending to the frame for relieving the springs of draft strains, a pair of hangers secured to each side of the truck frame near the ends of the frame for connecting the springs with the truck frame, each hanger having a lateral projection positioned outside the frame, and a spring shackle pivotally secured to the projection of each hanger and extending upwardly therefrom, the end of each spring being pivotally connected to a shackle at a point which is above the lower edge of the truck frame and outside of said frame whereby the frame is underslung between the springs wholly by the shackle connections.

4. A trailer, having in combination a chassis frame, a pair of axles, a pair of rectangular truck frames swiveled one under each end of the chassis frame, a pair of springs supporting each truck frame, the latter supported between and below the top of the springs and free to swing fore and aft with respect to the springs, and radius rods connecting each truck frame with each axle and some performing draft work and the others thrust and all defining the movement of the truck frame with respect to the axle.

In testimony whereof we have affixed our signatures.

CHARLES LAWRENCE SCHNEIDER.
HARVEY C. FRUEHAUF.